June 11, 1963 W. M. KENDZIOREK ET AL 3,092,916
ATTITUDE DETECTOR
Filed Feb. 24, 1959 2 Sheets-Sheet 2

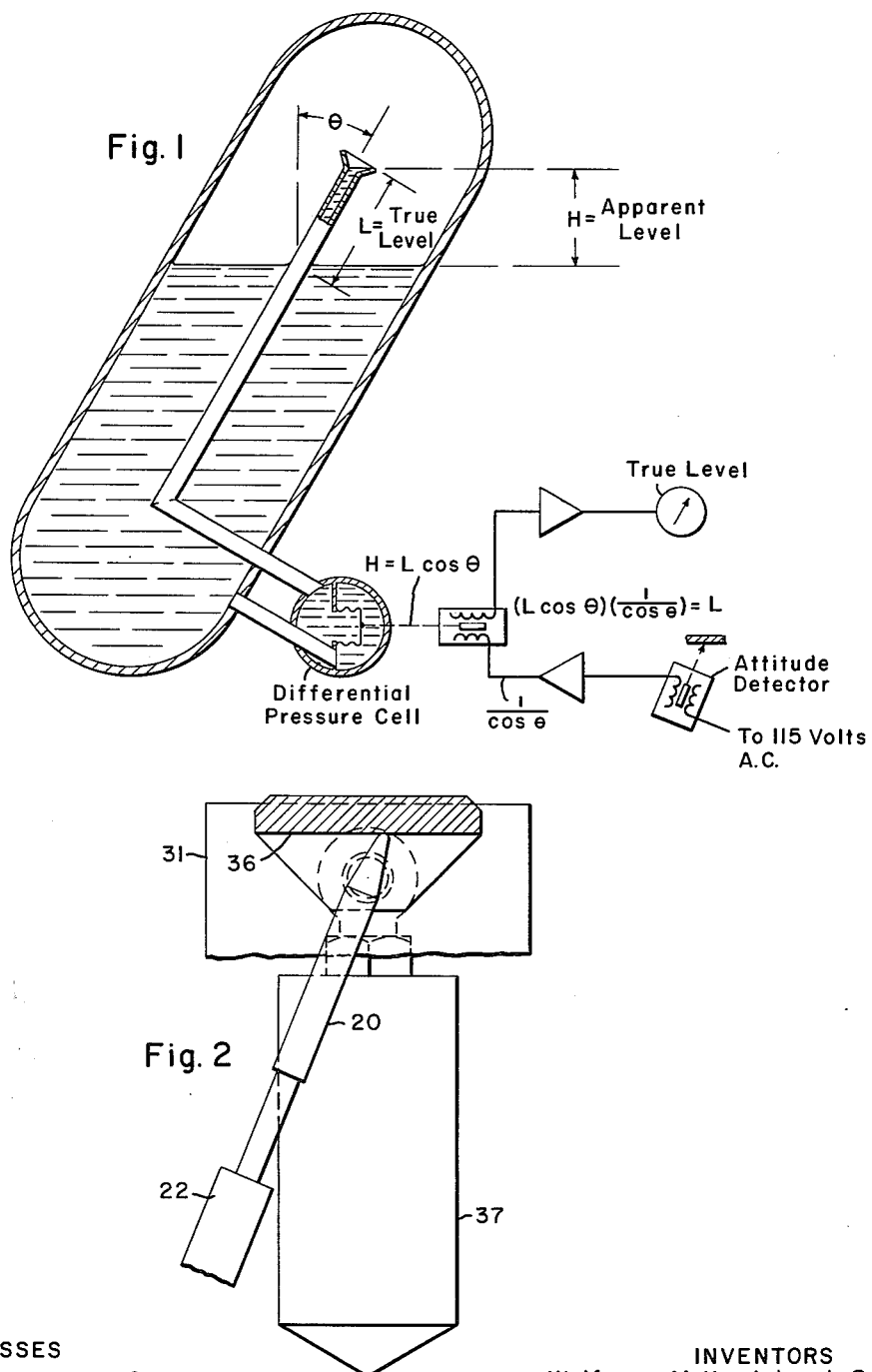

United States Patent Office 3,092,916
Patented June 11, 1963

3,092,916
ATTITUDE DETECTOR
Wolfgang M. Kendziorek and Jack W. Clements, Monroeville, Pa., assignors to Westinghouse Electric Corporation, East Pittsburgh, Pa., a corporation of Pennsylvania
Filed Feb. 24, 1959, Ser. No. 795,157
6 Claims. (Cl. 33—215)

This invention relates to an attitude detecting device, and more particularly to a device for accurately measuring liquid level in a container regardless of the attitude of the liquid container with reference to a vertical position.

In the past there has existed a difficulty in obtaining a true measurement of the liquid level inside of pressure vessels, such as boilers and pressurizers, located aboard ships. The measurement of liquid level in a container becomes increasingly inaccurate as the angle of deviation of the container from its vertical position increases. Devices of the prior art, that compensate for this error, are expensive, complicated and unreliable.

It is a broad object of this invention to provide a device that accurately measures true liquid level in a container regardless of the attitude of the container.

Another broad object of this invention is to provide a device that accurately measures true liquid level in a container that is relatively inexpensive, simple and reliable.

A more specific object of this invention is to provide a device that in its movement has two degrees of freedom so that it can indicate both the pitch and roll of the liquid container.

Another specific object of this invention is to provide a detector that gives an output inversely proportional to the cosine of the angle of deviation of a container for a liquid from the vertical.

The objects expressed are merely illustrative. Other objects and advantages will become more apparent from a study of the following specification and the accompanying drawings, in which:

FIG. 1 is a sketch of a typical liquid level measuring device using a differential pressure detecting cell and a differential transformer to give an output proportional to the vertical liquid level;

FIG. 2 is an end view, with parts broken away, of a cam shaft, cam, and push rod when the device is tilted.

Figure 3:
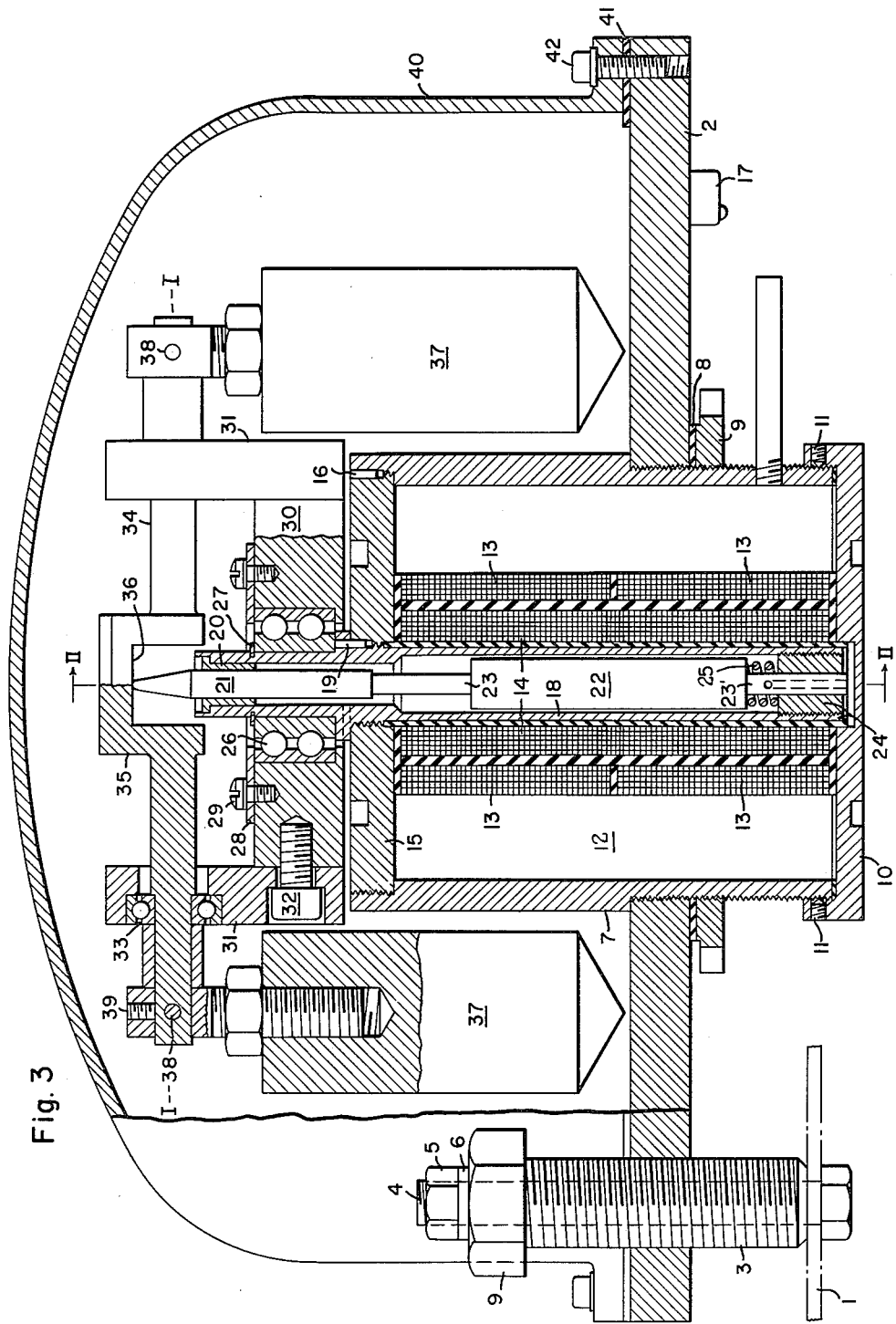
FIG. 3 is a front view, mostly in transverse section, of one embodiment of the invention as it may actually be constructed.

FIGURE 1 illustrates the method generally used to measure liquid level in pressure vessels. As can be seen, the apparent level H sensed by the differential pressure detector is the true level L, with respect to the container, times the cosine of the angle θ of the deviation of the container from a perpendicular to the liquid. The electrical output of the differential transformer attached to the differential pressure cell is proportional to the product of the primary excitation voltage and the position of the plunger relative to the electrical center of the differential transformer. In this system, the plunger position is proportion to H, or L cos θ, and the primary excitation is proportional to 1/cos θ. Therefore, the electrical output of the differential transformer is proportional to the product of the apparent level, H, and the output of the attitude detector, which is the secant of the angle θ, and yields true level, L.

Referring to FIG. 3, the plate 1 is a part rigidly secured to the ship upon which the attitude detector is to be used. This plate is arranged to be in a horizontal plane when the ship is on even keel, and thus is at right angles to the vertical axis of the liquid container on board ship in which the true liquid level is to be indicated.

The instrument base 2 is provided with at least three outwardly projecting ears (only one is shown) threaded to receive the sleeve bolts 3. To properly position the attitude detector with reference to the plate 1 the sleeve bolts are adjusted until the instrument base is parallel to plate 1. The solid bolts 4 are then inserted in the sleeve bolts and the parts rigidly secured together by the nuts 5 and lock washers 6. This means that as long as the ship is on even keel the instrument base 2 will be in a horizontal plane.

A housing 7 is securely threaded into the base 2 as shown and is prevented from dislodgement by the sealing gasket 8 and lock nut 9. The bottom of the housing 7 is closed by the cover 10 that is screwed on as shown and held in position by the set screws 11. A differential transformer 12, including the secondary windings 13 and primary windings 14, is inserted in the housing 7 and then a cap 15, having a central threaded opening, is screwed into the housing to hold the differential transformer in rigid position in the housing. A suitable pin 16 holds the cap against rotation. The leads for the differential transformer are not shown but are brought out of the attitude detector at terminal board 17.

A plunger guide tube 18, shaped as shown, is threaded into cap 15 and held in final position by a pin 19. The tube 18 is at its upper end provided with a rigidly secured sleeve bearing 20 for receiving the non-magnetic push rod 21. To the lower end of the push rod 21 the magnetic plunger 22 is secured by means of a non-magnetic stem 23. An axially and transversely apertured non-magnetic stem 23' is secured to the lower end of the plunger and fits singly into the sleeve bearing 24 threaded into the bottom of the tube 18. A spring 25 is disposed between the bearing 24 and the plunger 22 to urge the plunger upwardly in the tube 18. In assembling the parts it is apparent that the plunger and push rod are inserted in the tube 18 and then the spring 25, and bearing 24 positioned before the cover 10 is put into position.

A dual race ball bearing 26 has its inner race secured to the top of tube 18 by the spring C-ring 27 and the outer race is rigidly held in position by the plate 28 and screws 29 bolted to the pendulum yoke 30. This bearing 26 thus provides for a substantially frictionless mounting for the yoke 30 so that it may freely rotate about the axis of the push rod 21 in response to the minutest force couple.

The yoke has a pair of upwardly projecting ears 31 secured thereto by the bolts 32. The upper end of each ear carries a ball bearing 33. The two bearings are axially aligned and a shaft 34 is disposed for free rotation in the bearings 33. The mid-portion of the shaft has a U-shaped region 35 with the bight of the U being provided with a flat cam surface 36 namely, a surface all parts of which fall in the same plane. A pendulum 37 is, as shown mounted at each end of the shaft. The cross pins 38 and set screws 39 are so disposed that when the support 2 is perfectly horizontal the pendulums 37 are secured to hang vertically from their respective shaft ends and the flat cam surface 36 falls in a horizontal plane which is also perpendicular to the axis of plunger 22.

The whole assembly may be, and preferably is, hermetically sealed by the cover 40 and gasket 41 rigidly bolted to the support by the bolts 42.

The arrangement described gives the pendulums 37 two degrees of freedom. The pendulums 37 are free to rotate in bearings 33 about the axis I—I of the cam shaft 34, and are also free to rotate, with the yoke assembly 30, in bearings 26 about axis II—II.

The arrangement described thus permits the pendulums 37 to remain vertical for small as well as relatively large angles of displacement of support 2 from the horizontal.

The magnitude of the angle of displacement is limited only by the particular mechanical arrangement.

The attitude detector functions in the following manner: Suppose the device, as shown in FIG. 1, is mounted on a ship and that the support 2 is adjusted to be parallel to the plane of the plate 1 of the ship. Assume the attitude detector is installed so that the axis of shaft 34 is transverse of the length of the ship when the ship is on even keel. Under this condition the cam surface 36 is horizontal and perpendicular to the plunger axis. If now the ship takes any other position than on even keel, then the pendulums 37, will cause shaft 34 to rotate and yoke assembly 30 to rotate so that the pendulums remain in a vertical position.

Of course, for the mounting assumed, shaft 34 alone will rotate if the longitudinal axis of the ship is not horizontal, and yoke 30 alone will rotate when the ship lists, or rolls, to one side. In actual operation both motions take place simultaneously. The effect is that both shaft 34 rotates and yoke 30 rotates so that the pendulums at all times take a vertical position.

Since the shaft 34 rotates with respect to support 2 regardless of the type of motion of the ship it is apparent that the surface 36 tilts with respect to the push rod 21, as shown in FIG. 2. The spring 25 thus causes the plunger to move with respect to the differential transformer 12. This means that the flux distribution is changed.

The differential transformer is adjusted so that it has no output when the ship is on even keel. The moment the ship takes any position other than on even keel the transformer has an output. The electrical output of the differential transformer 12 is directly proportional to the displacement of the plunger 22. It can be shown that under these mechanical arrangements the plunger 22 moves longitudinally of itself by an amount inversely proportional to the cosine of the angle of displacement of the plunger axis from the vertical.

The device is thus sensitive to both pitch and roll displacements and gives an electrical output that is inversely proportional to the cosine of the angle of displacement of the plunger axis from the vertical.

Damping for the pendulums is provided by electrical means. Viscous damping could be provided by immersing the mechanism of the device in a suitable silicone oil. The viscosity of the oil could be varied to provide various degrees of damping for various applications. Other damping means could also be used.

In order to obtain an output that is proportional to the true level of liquid, the output of the attitude detecting device is amplified by any suitable means, and is used in combination with a differential pressure detector to provide an indication of true liquid level. The resultant output of the differential pressure detector is the product of the vertical level H, and the reciprocal of the cosine of the displacement angle $\theta$, or is the actual level of liquid L in the container.

The preceding description and diagrams are to be taken as only illustrative and are not to be construed in the limiting sense.

We claim as our invention:

1. An attitude detector used on a conveyance, including in combination, an outer case, a base secured thereto, clamping means for securing said base in a given fixed relation to the conveyance, a pendulum assembly pivotally mounted on an axis normal to said base, pendulum means attached to said pendulum assembly, pivoting means for said pendulum means having an axis normal to said assembly axis, damping means, and sensing means, including a differential transformer, a push rod and plunger assembly actuated by said pendulum means to vary the magnetic characteristics of said transformer, and a spring and suitable bearings to provide movement of said plunger along the said assembly axis, said sensing means thus giving an electrical output from said transformer proportional to the attitude of the base and thus the conveyance with respect to the horizontal.

2. An attitude detector used on a conveyance, including in combination, an outer case, a base secured thereto, clamping means for securing said base in a given fixed relation to the conveyance, a pendulum assembly pivotally mounted on an axis normal to said base, pendulum means attached to said pendulum assembly, including a pair of pendulums, a cam shaft with a flat cam face, said pendulums being rigidly fastened to the respective ends of said cam shaft with suitable connecting means, pivoting means for said pendulum means having an axis normal to the axis of said assembly axis, damping means, and sensing means giving an output inversely proportional to the cosine of the angle of deviation of said assembly axis from the vertical.

3. An attitude detector for a conveyance on which the detector is mounted, in combination, a mounting for the detector having a base, means for securing the mounting to the conveyance, when the conveyance is in a level position, so that the base is in a horizontal position, a pendulum yoke rotatably mounted in suitable anti-friction bearings on an axis normal to the base, a shaft rotatably mounted in suitable anti-friction bearings disposed on the yoke, the axis of rotation being normal to the axis of rotation of the yoke, a pair of aligned pendulums secured to the shaft one being at each end of the shaft, whereby any movement of the conveyance from its level position will, through said pendulums, cause said yoke to rotate just sufficient to maintain the shaft axis horizontal and cause the shaft to rotate in proportion to the change of attitude of the conveyance, and electric means for indicating the amount of change in attitude of the conveyance as a function of the angle of departure of the conveyance from its level position.

4. An attitude indicator for a conveyance, in combination, a mounting for the detector having a base, means for securing the mounting to the conveyance, when the conveyance is level, so that the base is horizontal, a pendulum yoke mounted on the base for rotation about a vertical axis, a shaft mounted for rotation on the yoke about a horizontal axis normal to the vertical axis of the yoke, a pair of aligned pendulums secured to the shaft one being at each end of the shaft, whereby tilting of said conveyance from a level position will cause said yoke to rotate to keep the shaft axis horizontal and cause the shaft to rotate by an extent determined by the angle of tilt of the conveyance from its level position, and electromagnetic means actuated by the rotation of said shaft to produce an indicating signal that is a function of the angle of tilt.

5. An attitude indicator for a conveyance, in combination, a mounting for the detector having a base, means for securing the mounting to the conveyance, when the conveyance is level, so that the base is horizontal, a pendulum yoke mounted on the base for rotation about a vertical axis, a shaft mounted for rotation on the yoke about a horizontal axis normal to the vertical axis of the yoke, pendulum means secured to the shaft, whereby tilting of said conveyance from a level position will cause said yoke to rotate to keep the shaft axis horizontal and cause the shaft to rotate by an extent determined by the angle of tilt of the conveyance from its level position, a cam surface on the shaft disposed transverse of the yoke axis and vertically displaced from the shaft axis, a spring biased non-magnetic plunger mounted for longitudinal movement in the yoke axis and at its upper end engaging the cam surface, said plunger having a magnetic portion at its lower end, a differential transformer having its windings disposed about the magnetic portion, whereby the magnetic portion of the plunger, as its upper end rides against the cam surface on the shaft, changes the magnetic coupling to thus produce an electrical signal as a function of the angle of tilt of the conveyance from its level position, 6. An attitude indicator for a conveyance, in combination, a mounting for the detector having a base, means for securing the mounting to the conveyance, when the conveyance is level, so that the base is horizontal, a pendulum yoke mounted on the base for rotation about a vertical axis, a shaft mounted for rotation on the yoke about a horizontal axis normal to the vertical axis of the yoke, a pair of aligned pendulums secured to the shaft one being at each end of the shaft, whereby tilting of said conveyance from a level position will cause said yoke to rotate to keep the shaft axis horizontal and cause the shaft to rotate by an extent determined by the angle of tilt of the conveyance, and electromagnetic means actuated by the rotation of said shaft to produce an electrical output proportional to one over cos $\theta$ where $\theta$ is the angle of tilt of the conveyance from its level position.

References Cited in the file of this patent

UNITED STATES PATENTS

| | | |
|---|---|---|
| 2,361,738 | Bird | Oct. 31, 1944 |
| 2,482,504 | Pennington | Sept. 20, 1949 |
| 2,544,438 | Allego | Mar. 6, 1951 |
| 2,564,018 | Malmqvist et al. | Aug. 14, 1951 |
| 2,672,334 | Chenery | Mar. 16, 1954 |
| 2,675,627 | Hinchman | Apr. 20, 1954 |
| 2,791,119 | Zinn et al. | May 7, 1957 |

FOREIGN PATENTS

| | | |
|---|---|---|
| 515,733 | Great Britain | Dec. 13, 1939 |
| 704,189 | Germany | Mar. 25, 1941 |